(12) United States Patent
Zhou et al.

(10) Patent No.: US 8,925,817 B2
(45) Date of Patent: Jan. 6, 2015

(54) CARD READER AND METHOD OF USE THEREOF

(71) Applicant: ID Tech, Cypress, CA (US)

(72) Inventors: Zheng Zhou, Anaheim, CA (US); Guo Qiang Mu, Pomona, CA (US); Zheng Dai, Buena Park, CA (US); Ge Jiang, Orange, CA (US)

(73) Assignee: ID Tech, Cypress, CA (US)

( * ) Notice: Subject to any disclaimer, the term of this patent is extended or adjusted under 35 U.S.C. 154(b) by 82 days.

(21) Appl. No.: 13/986,729

(22) Filed: Nov. 4, 2012

(65) Prior Publication Data

US 2014/0124576 A1    May 8, 2014

(51) Int. Cl.
*G06K 7/08*    (2006.01)
*H03M 1/12*    (2006.01)

(52) U.S. Cl.
CPC ............... *G06K 7/082* (2013.01); *H03M 1/124* (2013.01); *G06K 7/084* (2013.01)
USPC ..................... 235/449; 235/462.45

(58) Field of Classification Search
CPC ............................. G06K 7/084; G06K 7/087
USPC ................ 235/449, 493, 462.45, 472.01
See application file for complete search history.

(56) References Cited

U.S. PATENT DOCUMENTS

| | | | |
|---|---|---|---|
| 6,006,109 A | 12/1999 | Shin | |
| 6,747,547 B2 | 6/2004 | Benson | |
| 6,830,182 B2 | 12/2004 | Izuyama | |
| 7,309,012 B2 | 12/2007 | von Mueller et al. | |
| 7,324,836 B2 | 1/2008 | Steenstra et al. | |
| 7,409,234 B2 | 8/2008 | Glezerman | |
| 7,810,729 B2 * | 10/2010 | Morley, Jr. | 235/449 |
| 7,896,248 B2 * | 3/2011 | Morley, Jr. | 235/449 |
| 7,918,394 B1 | 4/2011 | Morley, Jr. | |
| 7,997,488 B2 | 8/2011 | Isuyama | |
| 8,534,546 B2 * | 9/2013 | McKelvey | 235/379 |
| 2002/0030871 A1 | 3/2002 | Anderson et al. | |
| 2003/0144040 A1 | 7/2003 | Liu et al. | |
| 2004/0012875 A1 | 1/2004 | Wood | |

(Continued)

FOREIGN PATENT DOCUMENTS

JP    3496022 B2    2/2004

OTHER PUBLICATIONS

Sebastien Bourdeauducq, "Reading Magnetic Card (almost) for Free", Jan. 26, 2009, p. 12.

(Continued)

*Primary Examiner* — Daniel St Cyr
(74) *Attorney, Agent, or Firm* — Minh N. Nguyen; Next IP Law Group LLP

(57) ABSTRACT

An integrated circuit that communicates with a host device via audio channels includes an interfacing circuit that receives and transmits analog signals on the audio channels. Such audio channels are designed for audio speakers and microphones and the interfacing circuit transmits digital data based on the received analog signals. The integrated circuit includes a processing device that is electrically coupled to the interfacing circuit. The processing device receives the digital data from the interfacing circuit and adjusts at least one parameter of the interfacing circuit based on the received digital data. The interfacing circuit receives the digital data from the processing device and transmits analog signals on at least one of the audio channels based on the at least one adjusted parameter.

20 Claims, 10 Drawing Sheets

(56) References Cited

U.S. PATENT DOCUMENTS

| | | |
|---|---|---|
| 2004/0041911 A1 | 3/2004 | Odagiri et al. |
| 2004/0093496 A1 | 5/2004 | Colnot |
| 2005/0247787 A1 | 11/2005 | von Mueller et al. |
| 2006/0094481 A1 | 5/2006 | Gullickson |
| 2006/0223580 A1 | 10/2006 | Antonio et al. |
| 2007/0250623 A1 | 10/2007 | Hickey et al. |
| 2010/0243732 A1 | 9/2010 | Wallner |
| 2010/0314446 A1* | 12/2010 | Morley, Jr. .................. 235/449 |

OTHER PUBLICATIONS

Tyner, "MSR500EX (Mini123EX) Portable Magnetic Card Reader", Apr. 27, 2007.

Luis Papdilla Visdome, "Turning your Mobile into a Magnetic Stripe Reader", Aug. 30, 2004.

Luis Papdilla Visdome, "Magnetic Stripe Reader Circuit", Jan. 28, 1997.

* cited by examiner

CARD READER AND METHOD OF USE THEREOF

BACKGROUND

Typically, consumers choose to pay for purchases by credit card. An issuer of the credit card actually is lending money to the cardholder to be paid to a business person or merchant. In most cases, a credit card is swiped through a machine known as reader. If the card issuer approves the transaction, an acquiring bank, which receives credit card transactions from the merchant, then credits the merchant's account. The merchant pays the acquiring bank a fee for processing the transaction. Once approved, the card issuer posts the transaction to the customer's account. At the end of the billing period, the cardholder receives a monthly statement from the issuer, at which time payment must be made.

Swiping the credit card through a machine at the point of sale allows the information from the magnetic stripe on the back of the card to be read. The machine transmits the credit card data to the bank that issued the card in order to verify that the account exists. If there is enough credit in the account to cover the sales transaction, the issuing bank generates an authorization code, and then places a hold on the cardholder's account for the amount of the sale.

In addition to a credit card company (e.g. Visa®, Master-Card®, Discover®, American Express®) there are two banks involved in most credit card transactions—the acquiring bank that handles the merchant's credit card account and the bank that issued the credit card. Information is passed among these three organizations quickly in order for a credit card transaction to be processed successfully.

All authorized credit card transactions are stored in batches and submitted to the acquiring bank at the end of each day. The acquiring bank then sends the transactions through the credit card association, which debits the card issuer for payment and credits the acquiring bank. Once the card issuer pays the acquirer, the acquirer pays the merchant. The acquiring bank deposits the amount of any sales drafts submitted by the merchant into the merchant's bank account.

Credit cards typically use magnetic stripes to store large amounts of data relating to a user. The data includes, but is not limited to, personal information (name, address, telephone numbers, and other data), sensitive information (bank account, credit, or other sensitive numbers like social security data), and security and format features. The magnetic stripes can have three separate tracks that can store around one hundred bytes of data. To process the data stored in the magnetic stripes, a card reader reads the tracks on the magnetic stripes using a read head and processes the data based on universal specifications and formats that apply to the magnetic stripe cards.

Many card readers include integrated chips for processing. The read head typically sends analog signals associated with the data stored on the magnetic stripes to the analog chip, which can have a feature of converting the analog signals to digital signals. The analog chip sends the converted digital signals to the digital chip, which can include a microprocessor that can process the digital signals for transmission to a host device, such as a personal computer, a personal device assistant, a smartphone, and a server. In today's market, gadgets are becoming smaller and more energy efficient.

Desirable in the art is an improved card reader that would improve upon the conventional card readers.

BRIEF DESCRIPTION OF THE DRAWINGS

The accompanying drawings illustrate preferred embodiments of the invention, as well as other information pertinent to the disclosure, in which.

DETAILED DESCRIPTION

Exemplary systems are first discussed with reference to the figures. Although these systems are described in detail, they are provided for purposes of illustration only and various modifications are feasible. Also, examples of flow diagrams of the systems are provided to explain the manner in which data is communicated between a card reader and a host device.

Figure 1:
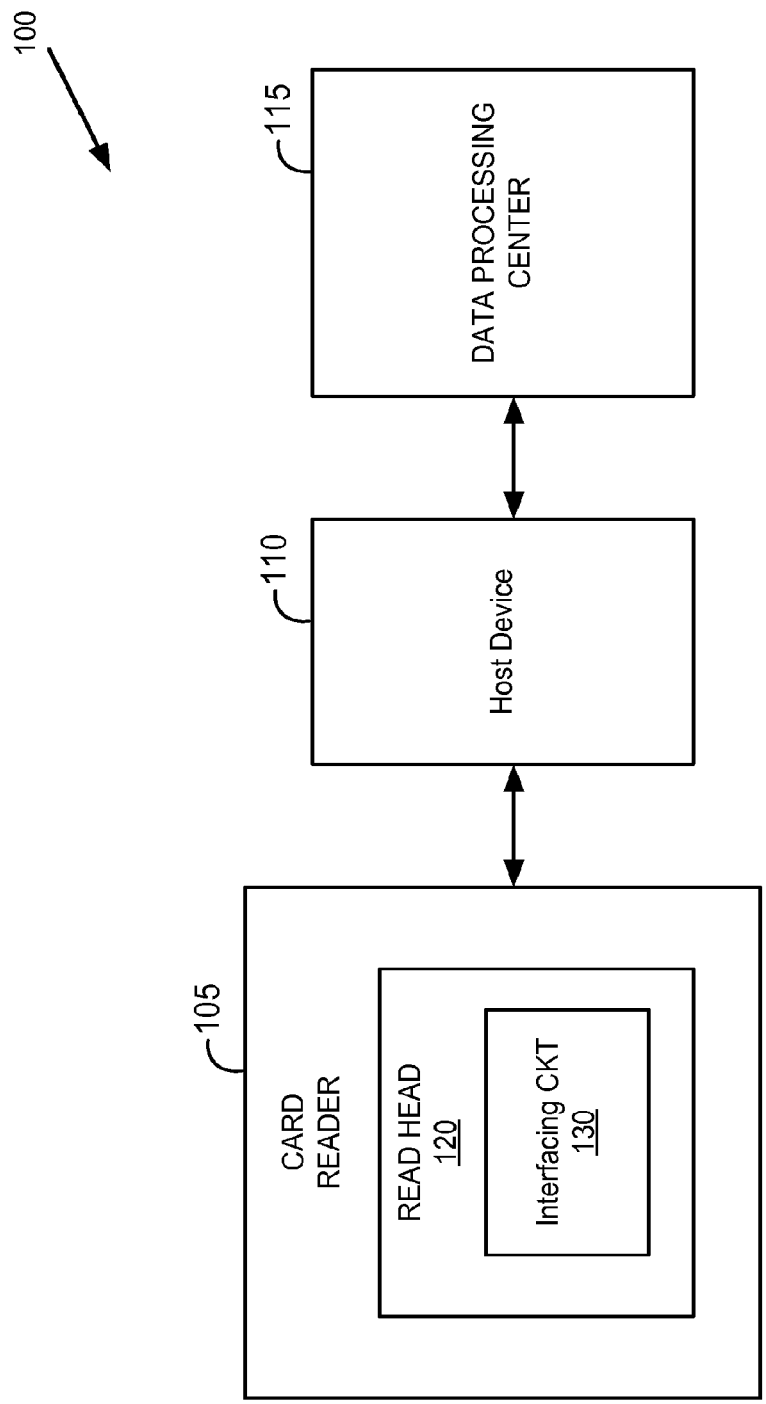
FIG. 1 is a block diagram that illustrates an embodiment of a card processing system having a read head with an interfacing circuit that interfaces and facilitates communication with a host circuit.

FIG. 1 is a block diagram that illustrates an embodiment of a card processing system 100 having a read head 120 with an interfacing circuit 130 that interfaces and facilitates communication with a host circuit 110. In general, the card processing system receives data from a card reader 105 that includes the read head 120, which senses data from a magnetic strip of a credit card and transmits digital signals that are associated with the sensed data to the host device 110. Such device 110 communicates with a data processing center 115 to process the sensed data and complete a credit card transaction.

The card reader 105 identifies magnetic stripe data in one of two ways, among others: 1) a card is swiped through a slot in the card reader 105 or the card is held next to a touchless card reader. Regarding a card with magnetic strip, the card reader 105 is programmed to identify the card data based on universal specifications and formats that apply to all magnetic stripe cards. The card reader 105 can be micro-controller based device that uses the read head 120 which reads the tracks on the magnetic stripe cards simultaneously.

The card reader 105 includes an interfacing circuit 130 that facilitates the card reader 105 to establish communication between the card reader 105 and the host device 110 using a communication cable, such as an audio jack/plug, universal serial bus (USB) connectors, and mini-USB connectors. The host device 110 includes, but is not limited to, a smart phone, a personal computer, and a laptop, among other portable devices having a processor (not shown). The host device 110 sends data to the data processing center 115, such as a credit card processor.

Figure 2:
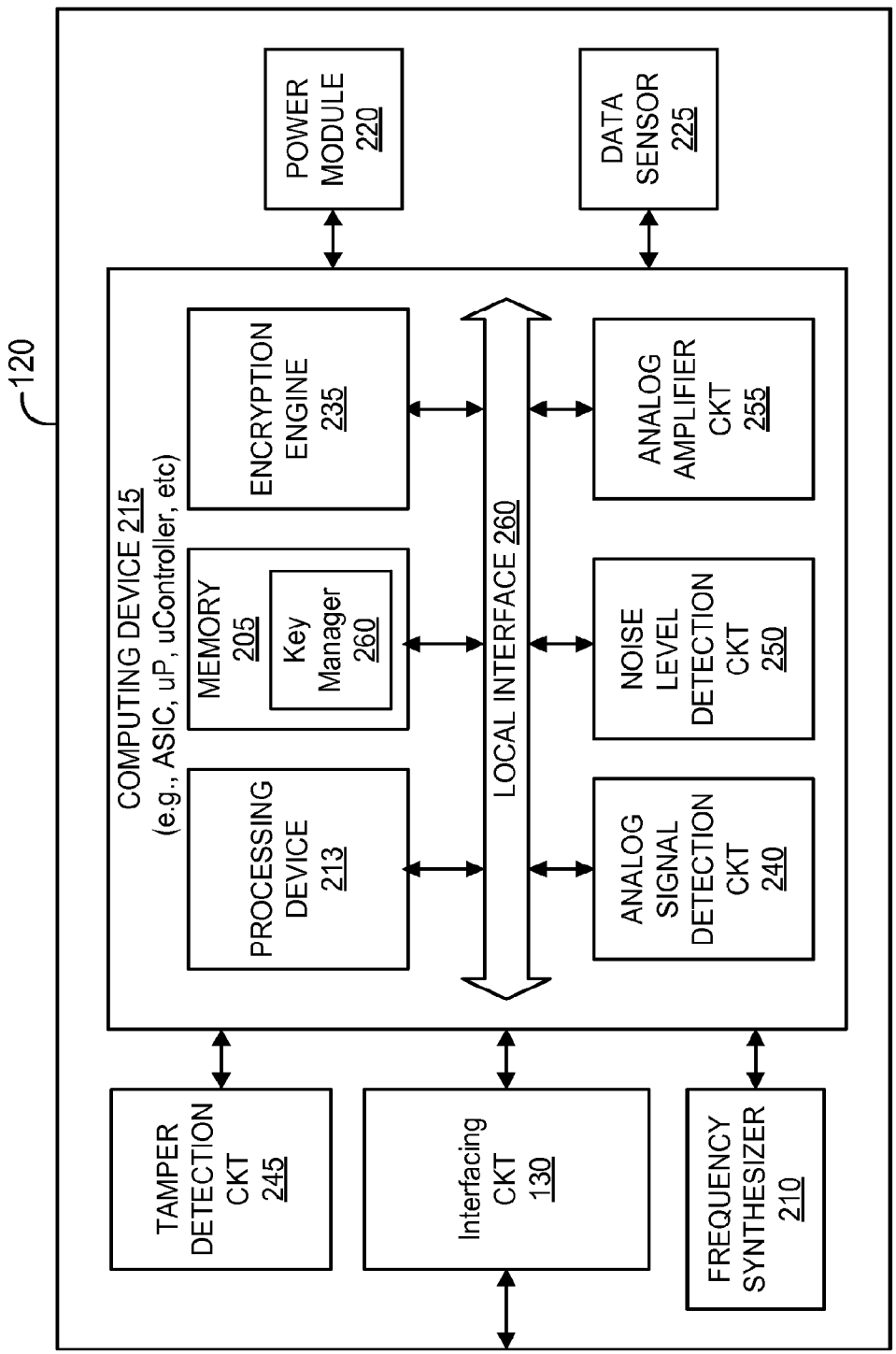
FIG. 2 is a more detailed block diagram that illustrates an embodiment of a read head having an interfacing circuit, such as that shown in FIG. 1.

FIG. 2 is a more detailed block diagram that illustrates an embodiment of the read head 120 having the interfacing circuit 130, such as that shown in FIG. 1. The interfacing circuit 130 receives and transmits analog signals on the audio channels, wherein the audio channels are designed for audio speakers and microphones. The interfacing circuit 130 transmits digital data based on the received analog signals.

The read head 120 includes a computing device 215, such as, an ASIC, microprocessor, and micro-controller, among others. The computing device 215 includes a processing device 213 is electrically coupled to the interfacing circuit 130 and receives the digital data from the interfacing circuit 130. The processing device 213 adjusts at least one parameter of the interfacing circuit 130 based on the received digital data, which is further described in connection to FIGS. 7-9. The interfacing circuit 130 receives digital data from the processing device 215 and transmits analog signals on at least one of the audio channels based on the at least one adjusted parameter.

The read head 120 can include other electrical components that can facilitate sensing and securing the data from the card the better, among others. The electrical components include, but are not limited to, memory 205, frequency synthesizer 210, power module 220, data sensor 225 (e.g., magnetic sensor), encryption engine 235, analog signal detection circuit 240, tamper detection circuit 245, noise level detection circuit 250, and analog amplifier circuit 255, some of which are described further in FIGS. 3-6. The computing device 215 can be an integrated circuit that is designed and made utilizing wafer technology to ensure minimum power consumption, a single IC design, and minimum silicon which can be accomplished in approximately 0.18 micron silicon.

In general, the data sensor 225 senses data from a card (e.g., a magnetic strip of a credit card) and transmits analog signals that are associated with the sensed data to the processing device. The computing device 215 processes the received electrical signals associated with the sensed data from the data sensor 225 and transmits data to the interfacing circuit 130 based on the processed digital signals.

Figure 3:
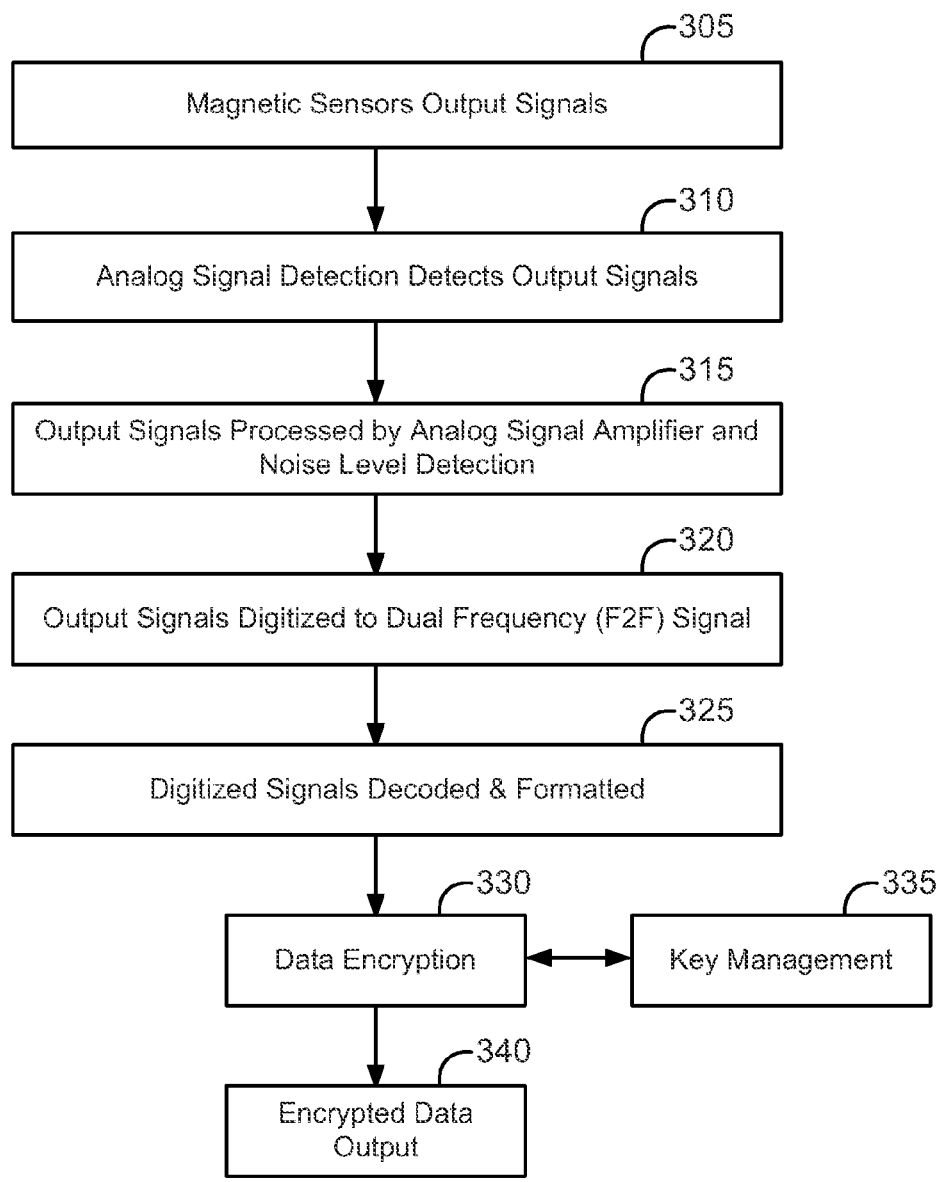
FIG. 3 illustrates an embodiment of a flow diagram that shows the processing of a magnetic card at a read head, such as that shown in FIG. 1.

FIG. 3 illustrates an embodiment of a flow diagram that shows the processing of a magnetic card at the read head 120, such as that shown in FIG. 1. Beginning with step 305, the data sensor 225 (FIG. 2, e.g., magnetic sensor) senses data from the card and outputs signals. In step 310, the analog signal detection circuit 240 (FIG. 2) detects the output signals from the data sensor 225. In step 315, the output signals are processed by the analog signal amplifier circuit 255 (FIG. 2) and the noise level detection circuit 250 (FIG. 2).

In step 320, the output signals are digitized to a dual frequency (F2F) signal by the computing device 215 (FIG. 2), which also decodes and formats the digitized signals, such as that shown in step 325. In step 330, the computing device 215 encrypts the decoded and formatted signals. In step 335, the computing device 215 can manage a security key that can be used to encrypt the digitized signals. In step 340, the computing device 215 transmits the encrypted data to the interfacing circuit 130, which transmits the encrypted data to the host device 110.

In an example of an embodiment, the computing device 215 can execute the encryption engine 235 (FIG. 2) to generate a security key (not shown). The encryption engine 235 stores the security key in memory 205 (FIG. 2), which can be access by the computing device 215. The memory 205 can store an encryption algorithm associated with the encryption engine 235. The encryption algorithm includes instructions that are executed by the processing device 213. Such instructions include logics that decode and encrypt the data from the read head 120. The memory 205 can include a key manager 260 (FIG. 2) that provides at least one encryption key for encoding the digitized signals from the read head 120. The encryption algorithm encrypts the data by utilizing the at least one encryption key. The processing device 213 outputs the encrypted digitized signals using the interfacing circuit 130, in which its function and operation are further described in connection to FIGS. 7-9

Figure 4:
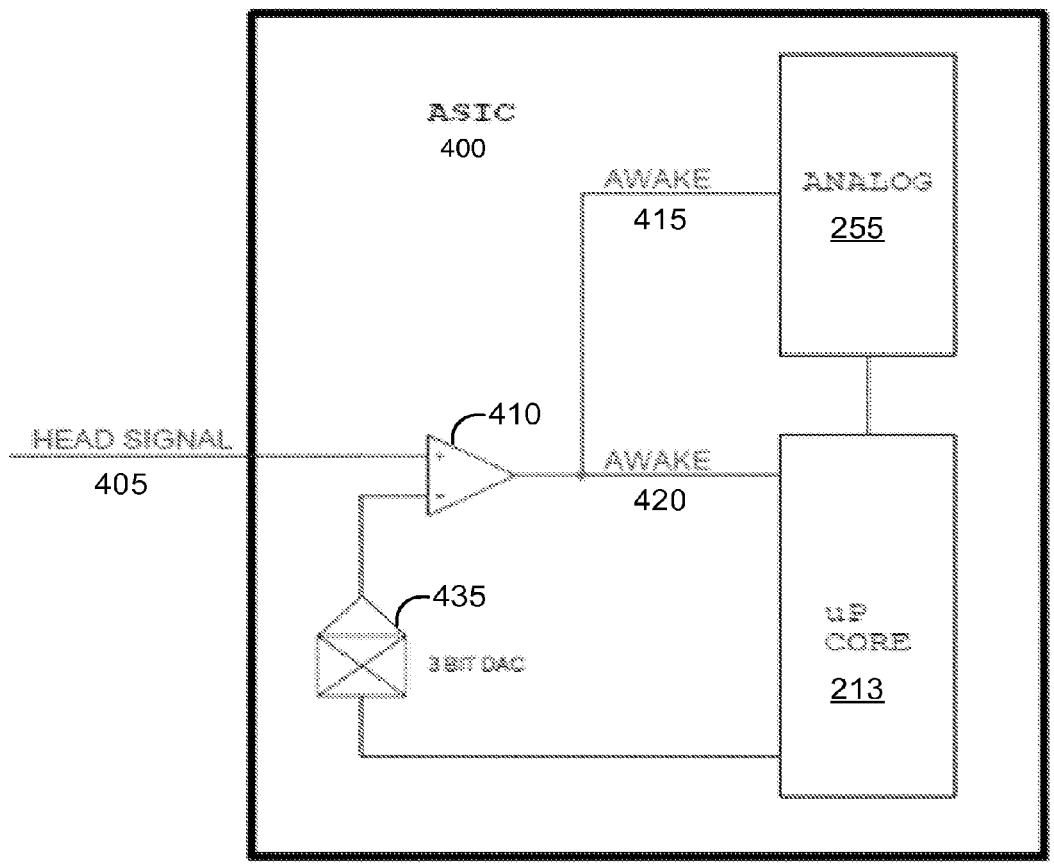
FIG. 4 is a more detailed block diagram that illustrates an embodiment of an analog signal detection circuit and a noise level detection circuit, such as that shown in FIG. 2.

FIG. 4 is a more detailed block diagram that illustrates an embodiment of the analog signal detection circuit 240 and the noise level detection circuit 250, such as that shown in FIG. 2. In this example, such circuits 240, 250 are implemented in an ASIC chip 400. The analog signal detection circuit 240 detects the analog signals from the data sensor 225 (FIG. 2). The analog signal detect circuit 240 can include a fully differential comparator 410 that is used to sense the presence of a magnetic stripe signal from the data sensor 225. The data sensor 225 transmits the head signal 405 upon detection of the magnetic stripe of the card. The comparator 410 can detect the initial zero pulses of a data sequence. It is capable of detecting a positive signal level with amplitude as low as 1.5 mV peak in minimum. The comparator 410 can use auto-zeroing for offset cancellation to ensure this level of accuracy. The comparator 410 transmits awake signals 415, 420 to the analog amplifier circuit 255 (FIG. 2), which is further described in connection to FIG. 5, and to the processing device 213 (FIG. 2). The comparator 410 also transmits the detected head signal 405 to the analog amplifier circuit 255, which amplifies the detected head signal 405 and transmits the amplified head signal to the processing device 213.

The noise level detection circuit 250 can reduce the ambient noise of surrounding electromagnetic fields in the analog signals from the data sensor 225. Noise level on the head signal can be detected using the noise level detection circuit 250, which can be a 3 Bit D/A converter 435 at the reference input of the signal detect comparator 410. The processing device 213 can set the signal detect level through the D/A convertor 435 and reads the output of the signal detect comparator 410. In the initialization stage, the processing device 213 sets the signal detect level one step (=1.5 mV), higher than the noise level as the wake up threshold.

Figure 5:
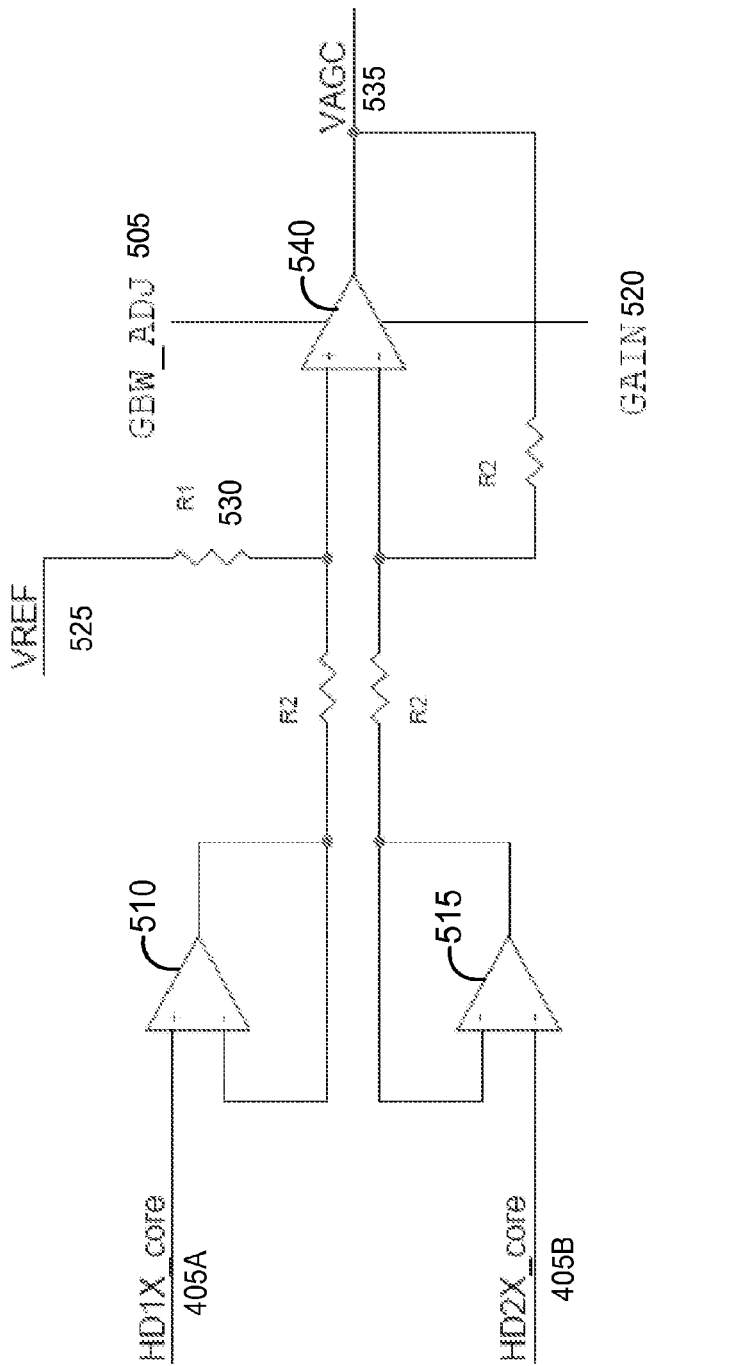
FIG. 5 is a more detailed block diagram that illustrates an embodiment of an analog amplifier circuit, such as that shown in FIG. 2.

FIG. 5 is a more detailed block diagram that illustrates an embodiment of the analog amplifier circuit 255, such as that shown in FIGS. 2 and 4. The analog amplifier circuit 255 amplifies the detected head signals, which can be in analog form. The analog amplifier circuit 255 can include a 9-bit Auto Gain Control Amplifier (AGC) 540 receiving a 4-bit GBW_ADJ bus 505. The analog amplifier circuit 255 receives the differential head signal 405A, B and amplifies it at amplifiers 510, 515 for further processing. The incoming signal amplitude of the received head signal 405A, B can vary with the swipe speed of the card. The amplitude of the received head signal 405A, B can range from 3 mVpp to 1 Vpp, at a data rate of up to 40 k bits/second. The head signal 405A, B is converted to single ended in the process. The selectable gain ranges from 1 to 256, in nine steps, in powers of two. The targeted output level ranges from 0.3*sigmax to 0.7*sigmax, where sigmax is 1.1V. The gain select bus 520 is driven in such a way that only a single bit is ever high (active) at any given time (i.e., "one-hot" encoded).

The nominal gain bandwidth (GBW) of the AGC analog amplifier circuit 255 can be adjustable to five different values by the processing device 213. The GBW_ADJ bus 505 controls the GBW of the AGC 540. The AGC 540 can be corrected for offset during a calibration phase at power on reset and at the end of every swipe. Source followers 525, 530 (e.g., voltage reference ("VREF"), and resistor 530) are on the input to the AGC 540. This high impedance is necessary so there is no loading on the head bias. The source followers 525, 530 have a GBW higher than the maximum GBW setting of the AGC 540.

Figure 6:
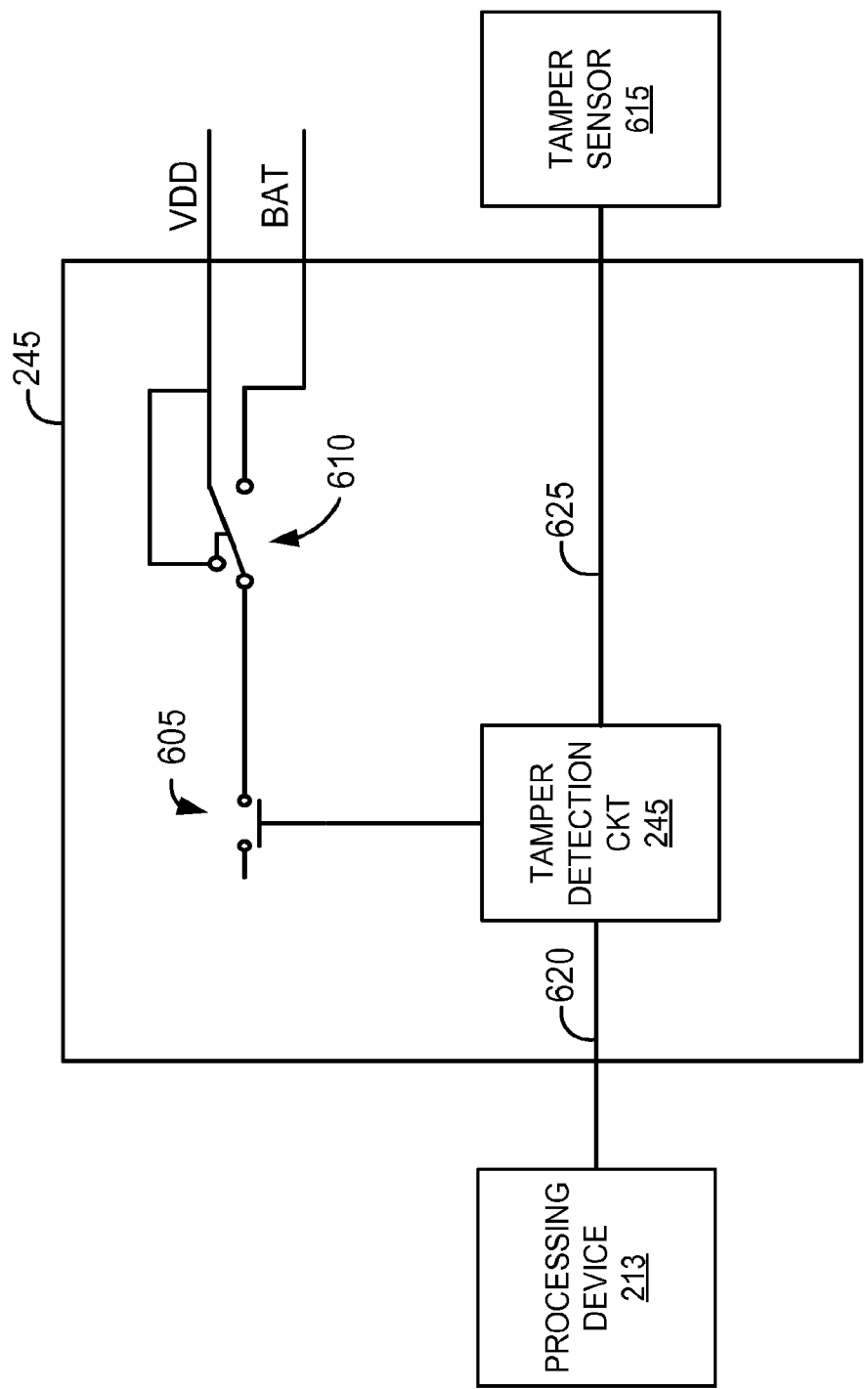
FIG. 6 is a more detailed block diagram that illustrates an embodiment of a tampering detection circuit, such as that shown in FIG. 2.

FIG. 6 is a more detailed block diagram that illustrates an embodiment of the tampering detection circuit 245, such as that shown in FIG. 2. The processing device 213 (FIG. 2) can generate and send a 'pseudo random pattern' (PRP) signal at line 620 to the tampering detection circuit 245, which sends the PRP signal 625 to a tamper sensor 615 (e.g., external 'detection switch') of the card reader 105 (FIG. 1) or of the read head 120 (FIGS. 1 and 2). The tamper sensor 615 returns the PRP signal at line 625 to the tampering detection circuit 245. Such tampering detection circuit 245 can analyze the returning PRP signal for authenticity on a real time basis, and if it has been compromised (e.g., a tamper has been detected), the tampering detection circuit 245 can notify the processing device 213 at line 620 to erase all sensitive Encryption Data (Keys) stored in memory 205 (FIG. 2), disable the read head 120 via switches 605, 610 disconnecting the power source, and informs the host device 110 (FIG. 1) of the 'tamper event'. For example, the tampering detection circuit 245 can delete at least one encryption key.

Figure 7:
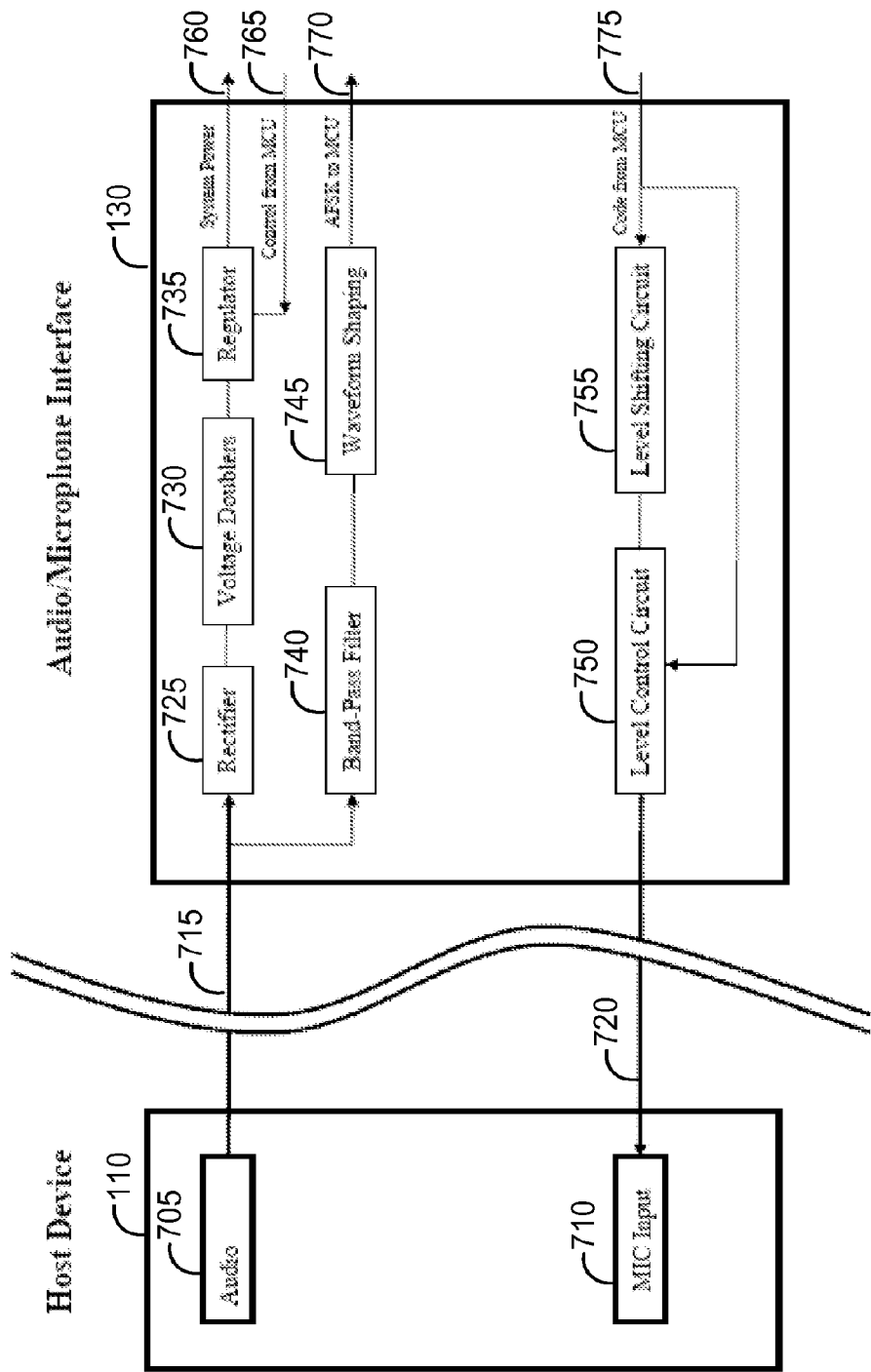
FIG. 7 is a more detailed block diagram that illustrates an embodiment of an interfacing circuit, such as that shown in FIG. 2.

FIG. 7 is a more detailed block diagram that illustrates an embodiment of the interfacing circuit 130, such as that shown in FIG. 2. In this example, the interfacing circuit 130 receives and transmits analog signals on audio channels 715, 720. Such audio channels 715, 720 can be designed for audio speakers and microphones via communication cables, such as an audio plug on the card reader 105 or an audio jack on the host device 110. The interfacing circuit 130 transmits digital data based on the received analog signals from the data sensor 225 (FIG. 2). The host device 110 includes an audio output circuit 705 and a MIC input circuit 710 that transmits and receives analog signals to/from the interfacing circuit 130, respectively.

The processing device 213 (FIG. 2) is electrically coupled to the interfacing circuit 130 and receives the digital data from the interfacing circuit 130. The processing device 213 can adjust at least one parameter of the interfacing circuit 130 based on the received digital data. The interfacing circuit 130 receives the digital data from the processing device 213 and transmits analog signals based on the at least one adjusted parameter.

For example, the interfacing circuit 130 includes a level control circuit 750 and level shifting circuit 755 that are electrically coupled to the processing device 213 at line 775. Such processing device 213 can instruct the level control circuit 750 and the level shifting circuit 755 to adjust the voltage level and the data baud rate, respectively, of the data that is transmitted to the host device 110. The processing device 213 transmits data to the interfacing circuit 130, which transmits the data from the processing device 215 to the host device 110 based on the instructions from the processing device 213 associated with the voltage level and data baud rate.

The interfacing circuit 130 can include a band-pass filter 740 and waveform shaping 745, both of which facilitates processing and transmitting the received analog signals from the host device 110 to the processing device 213 at line 770. The band-pass filter 740 passes frequencies of the analog signals within a certain range and rejects frequencies outside that range. The waveform shaping 745 modifies the shape of an electronic waveform associated with the received analog signals.

The interfacing circuit 130 can further include a rectifier 725, voltage doubler 730, and regulators 735 to provide power to the card reader 105 (FIG. 1) at line 760. The rectifier 725 converts alternating current (AC) signals to direct current (DC) signals and inputs the DC signals at the voltage doubler 730. The voltage doubler 730 can double the input voltage by, for example, charging capacitors from the input voltage and switches these charges that doubles the voltage at the output of the voltage doubler 730. The regulator 735 receives the doubled-voltage signal and maintains a constant voltage level to supply power to the card reader 105.

To get more power and reduce the impact of noise between the interfacing circuit 130 and the host device 110, differential signaling on the left and right channel 715 can be used instead of single ended signaling, which is described in more detail in connection to FIG. 8. To get maximum power square wave can be used. The host device 110 can select various signal frequency and/or certain frequency range based on the host device's audio output ability, which can generate more power on the card reader 105, e.g. 1 k~5 k HZ. The processing device 213 instructs the regulator 735 at line 765 to provide various power level to the card reader 105.

Figure 8:
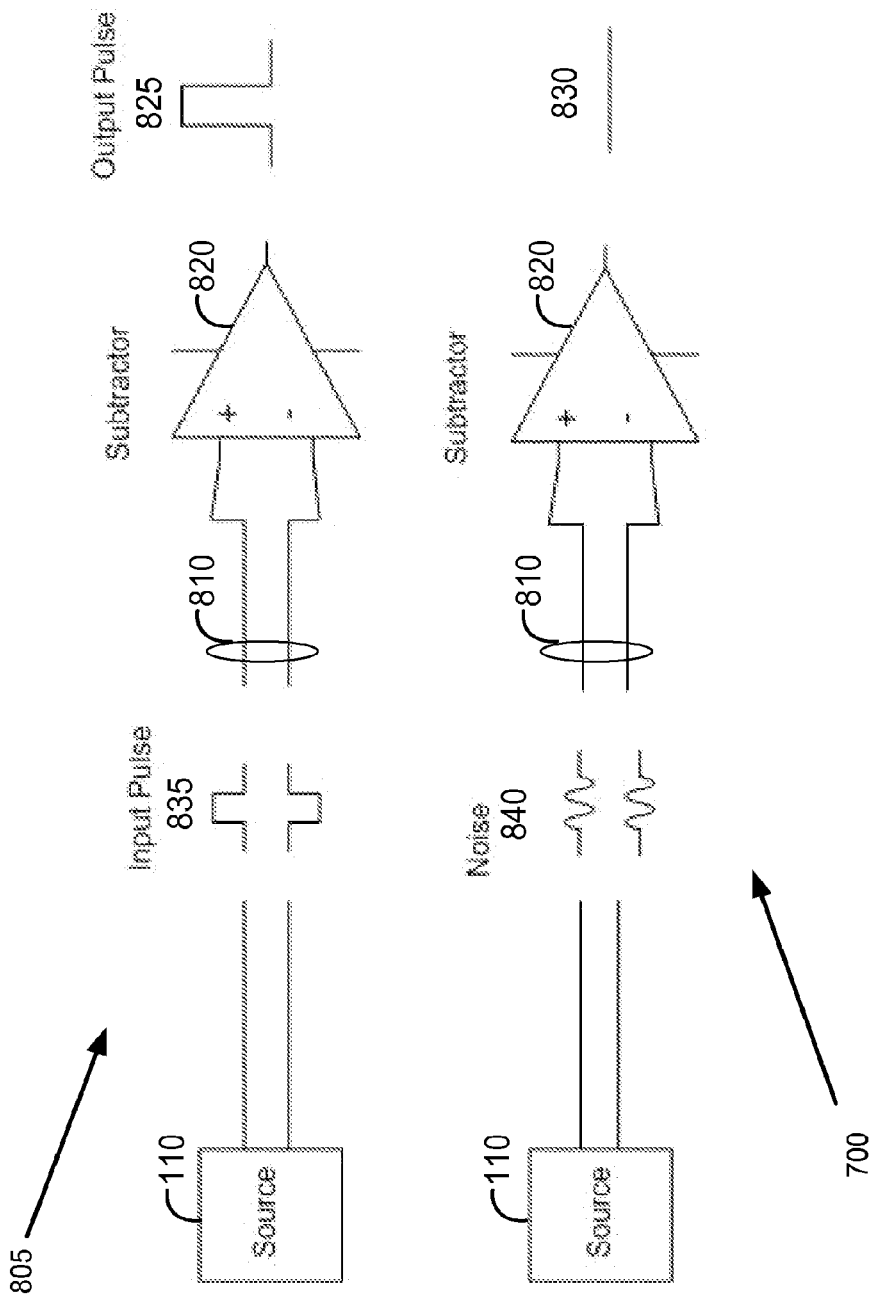
FIG. 8 illustrates an embodiment of a system with differential signaling implemented in an interfacing circuit, such as that shown in FIGS. 1 and 2.

FIG. 8 illustrates an embodiment of systems with differential signaling implemented in the interfacing circuit 130, such as that shown in FIGS. 1 and 2. The interfacing circuit 130 can receive differential square wave on the left and right audio channels 810, which can efficiently reduce the noise/signal ratio, especially for low voltage signal from host devices. The interfacing circuit 130 can include a subtractor 820 that receives electrical signals from the host device 110. At the input of the subtractor 820, the differential square wave 835 is transmitted on line 810 to the input of the subtractor 820.

For example, in a single-ended digital system, the high logic level is Vs, noise is Vn and the low logic level is 0 V. The difference between the two levels is therefore Vs+Vn−0. On the other hand, in a differential system 810 with the same supply voltage, responsive to the voltage difference in the high state, one of the audio channels 810 is at Vs and the other at 0 V, is Vs−0+Vn=Vs+Vn, which is shown as output pulse 825. Responsive to the voltage difference in the low state, the voltages on the audio channels are exchanged, is 0−Vs+Vn=−Vs+Vn. The difference between high and low logic levels is therefore Vs+Vn−(−Vs+Vn)=2 Vs at 825. This is twice the difference of the single-ended system.

Noise 840 can be transmitted on line 810 at the input of the subtractor 820. If the voltage noise on one channel 810 is correlated to the noise on the other one 810 at the subtractor 820, the noise cancels out at the input of the subtractor 820, which is shown as output pulse 830. If supposing that the voltage noise on one of the audio channels 810 is uncorrelated to the noise on the other one, approximately twice as much noise can now cause an error with the differential system compared with the single-ended system. In other words, the noise immunity can be doubled.

Figure 9:
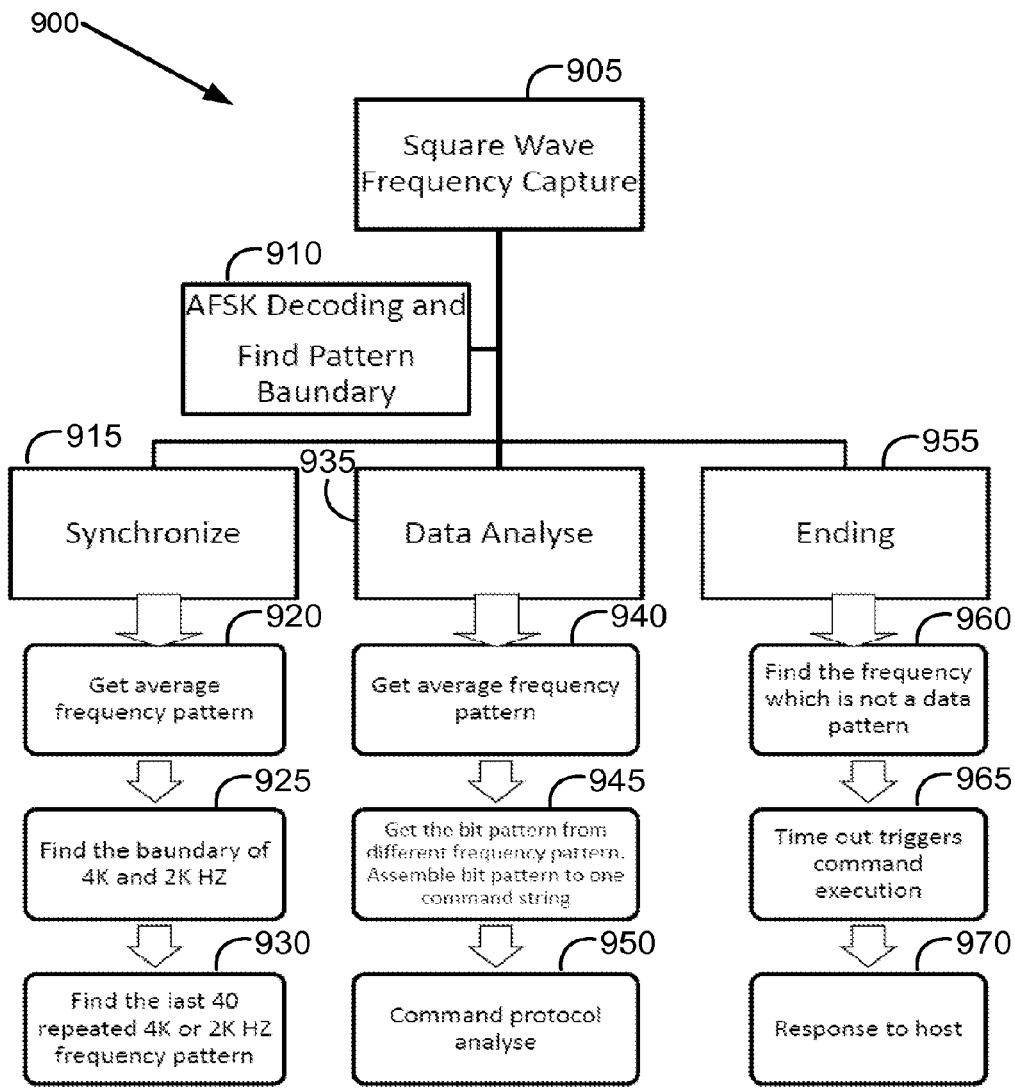
FIG. 9 illustrates an embodiment of a flow diagram that shows the processing of data that is received by an interfacing device, such as that shown in FIG. 7.

FIG. 9 illustrates an embodiment of a flow diagram that shows the processing of data that is received by the interfacing device 130 from the host device 110, such as that shown in FIG. 7. In step 905, the interfacing device 130 captures square wave frequency (e.g., input pulse 835 of FIG. 8) from the host device 110. In step 910, the interfacing device 130 can use enhanced Audio frequency-shift keying (AFSK) technique in communication at approximately 1 k~4 KHz. Two digits data can be used in modulation with a 0.5 KHz frequency deviation.

Each byte can be divided into four (4) groups of two (2) digits pattern. Each pattern has its corresponding frequency, e.g. '00' is 2.4 KHz, '01' is 3 KHz, '10' is 3.4 KHz, '11' is 4 KHz. To make the output more accurate, each pattern can be repeated ten (10) times in the output string. The interfacing device 130 can use other frequency for special command, e.g. 1.5 KHz for adaptor board, 2.0 KHz for IOS/Android SDK, 3.2 KHz for Blackberry SDK.

In step 915, the interfacing device 130 can synchronize with the host device 110. The host device 110 (FIG. 1) can transmits, for example, 40 '11' patterns and 40 '00' patterns to the interfacing device 130 to synchronize with the processing device 213 (FIG. 2). The processing device 213 can use the synchronize pattern to determine the exact starting wave. An example of a technique to determine the exact starting wave is to determine the average frequency pattern that is transmitted by the host device 110, such as that shown in step 920. If card reader 105 (FIG. 1) fails to determine the 40 same patterns in a block, the processing device 213 moves the block boundary until it can receive 40 same '11' or '00' patterns in a block, such as that shown in steps 925 and 930. Responsive to determining the starting wave, the processing device 213 starts capturing data.

In step 935, the processing device 213 can analyzed the data captured at the input of the interfacing device 130 from the host device 110. For example, when the processing device 213 analyses the signal, the processing device 213 can parse the 10 same patterns out, remove the two square waves which are on the boundary, then use the central 8 patterns for further calculation. In step 940, the processing device 213 can use the average frequency to determine which bit pattern in Equation 1, as follows:

$$\text{average frequency} = \frac{\sum_{n=0}^{7} Xn}{8} \qquad (\text{Eq. 1})$$

In step 945, the processing device 213 can look for the average frequency in pattern table stored in memory 205 (FIG. 2), determine the corresponding bit pattern, and then assemble it to one byte. In step 950, the processing device 213 can analyze the command protocol based on the assembled data.

In step 955, the processing device 213 can determine whether or not the bit pattern is ending. For example, in step 960, the processing device 213 determines which frequency is not a data pattern and which is an ending pattern. Such ending pattern can be a repeat 2 KHz square wave, which can be used by the interfacing circuit 130 to supply power for the card reader 105. In step 965, the processing device 213 can time-out of receiving the frequency pattern responsive to determining the ending pattern and triggers command execution based on the received data from the host device 110. In step 970, the processing device 213 can transmit a response to the host device 110 based on the received data.

Figure 10:
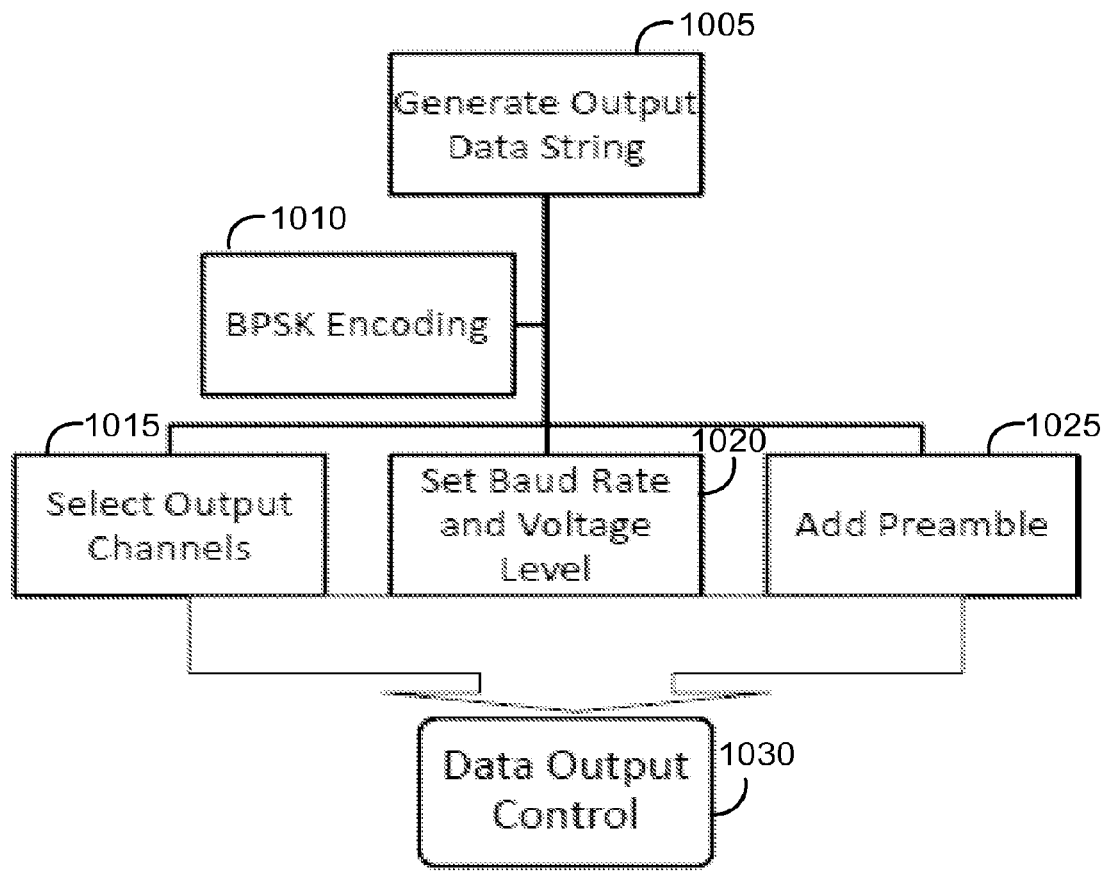
FIG. 10 illustrates an embodiment of a flow diagram that shows the processing of data that is transmitted by an interfacing device, such as that shown in FIG. 7.

FIG. 10 illustrates an embodiment of a flow diagram that shows the processing of data that is transmitted by an interfacing device 130 to the host device 110, such as that shown in FIG. 7. In general, the processing device 213 can establish bi-communication with the host device 110 based on the receive data from the host device 110. In step 1005, the processing device 213 generates and transmits an output data string to the host device 110 using one of the audio channels 715, 720 (FIG. 7), such as the microphone channel. The processing device 213 can be a Universal asynchronous receiver/transceiver using Manchester Encoding as a binary phase shift key (BPSK), such as that shown in step 1010.

In step 1010, the processing device 213 encodes the digital data for signal distortion control based on the received digital data from the host device 110 via the interfacing circuit 130. For distortion control, the processing device 213 can use Manchester Encoding to ensure there is no more than two 0 or 1 in output signal. In general, Manchester encoding is a form of binary phase-shift keying (BPSK). It is a simple method for encoding digital serial data of arbitrary bit patterns without having any long strings of continuous zeros or ones, and having the encoding clock rate embedded within the transmitted data.

The encoding of digital data in Manchester format defines the binary states of "1" and "0" to be transitions rather than static values. There are two possible definitions that have alternate assignments of the logic levels to the two possible transitions of rising and falling edges, which can be appreciated and is known to those skilled in the art.

The Manchester-encoded data stream utilizes two levels for each transition, because it is encoded as a low-level to high-level transition or high-level to low-level transition. Accordingly, the Manchester encoding can take twice as many logic-level states to encode data.

In step 1015, the processing device 215 can assign different channels for different host devices, such as Blackberry and IOS that use different channels. In addition, different host devices 110 can have different input requirements. To support this, the output of the interfacing circuit 130 can be adjusted at multiple voltage levels, and data baud rate can be adjusted among 9600, 4800, 2400 bps, such as that shown in step 1020. To realize automatic adjustment, these parameters can be controlled by host device 110 through bi-direction communication. For example, the processing device 213 is electrically coupled to the interfacing circuit 130. The processing device 213 receives the digital data from the interfacing circuit 130 and adjusts at least one parameter of the interfacing circuit based on the received digital data. The interfacing circuit 130 receives the digital data from the processing device 213 and transmits analog signals on at least one of the audio channels based on the at least one adjusted parameter. In step 1025, the adjusted parameter of the interfacing circuit is associated with adjusting input voltage levels or adjusting data baud rate.

In step 1025, the processing device 213 encodes the preamble of the digital data to filter out a voltage offset unstable period based on the received digital data from the interfacing circuit. The preamble can be utilized to filter out the voltage offset unstable period. In some cases, the host devices 110 have large voltage offset bias at the beginning of data recording. The preamble can be used to filter out the offset unstable period and to make sure all the card data output stays at a steady voltage offset. As such, the processing device 213 can encode the preamble of the digital data to filter out a voltage offset unstable period based on the received digital data from the interfacing circuit. In step 1030, the processing device 1030 send the data output control instructions to interfacing circuit 130 based on steps 1015, 1020, and 1025.

As described herein, an improved card reader and/or read head are presented utilizing an interfacing circuit to facilitate communication between the read head and the host device. This approach allows for the bi-communication to and from the card reader and/or read head to accommodate various input requirements of one or more host devices.

Although the invention has been described in terms of exemplary embodiments, it is not limited thereto. Rather, the appended claims should be construed broadly to include other Therefore, having described the disclosure, at least the following is claimed:

1. An integrated circuit that communicates with a host device via audio channels, the integrated device comprising:
   an interfacing circuit that receives and transmits analog signals on the audio channels, wherein the audio channels are designed for audio speakers and microphones, wherein the interfacing circuit transmits digital data based on the received analog signals; and
   a processing device that is electrically coupled to the interfacing circuit, wherein the processing device receives the digital data from the interfacing circuit and adjusts at least one parameter of the interfacing circuit based on the received digital data, wherein the interfacing circuit receives the digital data from the processing device and transmits analog signals on at least one of the audio channels based on the at least one adjusted parameter.

2. The integrated circuit of claim 1, wherein the at least one adjusted parameter of the interfacing circuit is associated with adjusting input voltage levels or adjusting data baud rate.

3. The integrated circuit of claim 1, wherein the processing device encodes the digital data for signal distortion control based on the received digital data from the interfacing circuit.

4. The integrated circuit of claim 1, wherein the processing device encodes the preamble of the digital data to filter out a voltage offset unstable period based on the received digital data from the interfacing circuit.

5. The integrated circuit of claim 1, further comprising a read head that senses data from a magnetic strip of a card and transmits digital signals that are associated with the sensed data to the processing device, wherein the processing device processes the received electrical signals associated with the sensed data and transmits data to the interfacing circuit based on the processed digital signals.

6. The integrated circuit of claim 5, further comprising an analog signal detection circuit that detects the analog signals from the read head.

7. The integrated circuit of claim 6, further comprising an analog amplifier circuit that amplifies the detected analog signals.

8. The integrated circuit of claim 5, further comprising memory that stores an encryption algorithm, wherein the encryption algorithm includes instructions that are executed by the processing device, wherein the instructions include logics that decode and encrypt the data from the read head.

9. The integrated circuit of claim 8, wherein the memory includes a key manager that provides at least one encryption key for encoding the data from the read head.

10. The integrated circuit of claim 9, wherein the encryption algorithm encrypts the data by utilizing the at least one encryption key.

11. The integrated circuit of claim 10, further comprising a tamper detection circuit that deletes the at least one encryption key.

12. The integrated circuit of claim 5, further comprising a noise level detection circuit that reduces the ambient noise of surrounding electromagnetic fields in the analog signals from the read head.

13. The integrated circuit of claim 1, wherein the integrated circuit utilizes wafer technology that ensures minimum power consumption, a single IC design, and minimum silicon which is accomplished in approximately 0.18 micron silicon.

14. A card reader that communicates with a host device via audio channels, the integrated device comprising:
   an interfacing circuit that receives and transmits analog signals on the audio channels, wherein the audio channels are designed for audio speakers and microphones, wherein the interfacing circuit transmits digital data based on the received analog signals;
   a processing device that is electrically coupled to the interfacing circuit, wherein the processing device receives the digital data from the interfacing circuit and adjusts at least one parameter of the interfacing circuit based on the received digital data, wherein the interfacing circuit receives the digital data from the processing device and transmits analog signals on at least one of the audio channels based on the at least one adjusted parameter, and
   a read head that senses data from a magnetic strip of a card and transmits digital signals that are associated with the sensed data to the processing device, wherein the processing device processes the received electrical signals associated with the sensed data and transmits data to the interfacing circuit based on the processed digital signals.

15. The card reader of claim 14, wherein the at least one adjusted parameter of the interfacing circuit is associated with adjusting input voltage levels or adjusting data baud rate.

16. The card reader of claim 14, wherein the processing device encodes the digital data for signal distortion control based on the received digital data from the interfacing circuit.

17. The card reader of claim 14, wherein the processing device encodes the preamble of the digital data to filter out a voltage offset unstable period based on the received digital data from the interfacing circuit.

18. The card reader of claim 14, further comprising memory that stores an encryption algorithm, wherein the encryption algorithm includes instructions that are executed by the processing device, wherein the instructions include logics that decode and encrypt the data from the read head.

19. The card reader of claim 18, wherein the memory includes a key manager that provides at least one encryption key for encoding the data from the read head, wherein the encryption algorithm encrypts the data by utilizing the at least one encryption key.

20. A read head that communicates with a host device via audio channels, the integrated device comprising:
   an interfacing circuit that receives and transmits analog signals on the audio channels, wherein the audio channels are designed for audio speakers and microphones, wherein the interfacing circuit transmits digital data based on the received analog signals;
   a processing device that is electrically coupled to the interfacing circuit, wherein the processing device receives the digital data from the interfacing circuit and adjusts at least one parameter of the interfacing circuit based on the received digital data, wherein the interfacing circuit receives the digital data from the processing device and transmits analog signals on at least one of the audio channels based on the at least one adjusted parameter, and
   a data sensor that senses data from a magnetic strip of a card and transmits digital signals that are associated with the sensed data to the processing device, wherein the processing device processes the received electrical signals associated with the sensed data and transmits data to the interfacing circuit based on the processed digital signals.

* * * * *